United States Patent Office 3,328,300
Patented June 27, 1967

3,328,300
STABILIZED ORGANIC COMPOSITIONS
David W. Young, Homewood, Ill., assignor to
Sinclair Research, Inc.
No Drawing. Filed Mar. 15, 1965, Ser. No. 439,953
16 Claims. (Cl. 252—41)

This invention is directed to improve stabilizers for organic materials which tend to deteriorate in storage or in use due to undesirable oxidation reactions. More specifically this invention relates to antioxidant systems for organic compounds which systems comprise acenaphth [1,2-α] acenaphthylene alone as an antioxidant or admixed with another antioxidant. Typical organic materials which tend to deteriorate due to undesirable oxidation reactions are liquids such as lubricating oils, alcohols, polyphenyl ethers, etc., semi-solids, exemplified by greases; and solids such as high molecular weight polymers. The useful antioxidants include the various compounds possessing oxidation inhibiting qualities such as mercapto alkanoic acids; substituted phenols; alkylated aromatic amines, etc.

Untreated organic compounds in storage or in use tend to deteriorate due to oxidation reactions between the compounds and oxygen in the atmosphere. The oxygen may, for instance, cause the organic compounds to undergo a change in viscosity, either in increase or a decrease, depending upon the fluid. The oxidized organic compounds may also become corrosive to metals and, in the case of lubricating oils and greases, this condition may limit the kind of metal that may be used in contact with the fluid and may cause failure or troublesome operation of such metal parts. The deposition of sludge is another condition that may arise when the organic materials are subjected to thermal and oxidative stresses. Further, the oxidation process is usually accentuated by elevated temperatures such as occur in engines and operating machinery. When such organic compositions are used as motor or machinery lubricants, their stability may be still further drastically reduced due to their contact with metal surfaces which give up metallic particles into the lubricant. Such abraded or dissolved metals or metal salts appear to act as oxidation catalysts in the lubricant causing the formation of primary oxidation products which, in turn, may cause further degradation of the organic compounds present in the composition. In addition, water also causes corrosion of metallic surfaces and accentuates oxidation of the lubricant. Also, liquid and solid organic polymers tend to decompose under the influence of oxygen. In many cases, decreases in molecular weight of the polymers as well as noticeable changes in odor and clarity can be produced by the action of oxygen on the polymers.

Particular organic compounds which are advantageously stabilized against oxidative deterioration when in storage or in use are high molecular weight polymers, preferably those which contain recurring groups derived from ethylene, propylene or butylene; high molecular weight alcohols, preferably those having 6 to 20 carbon atoms; mineral oils, including thickened-mineral oils.

It is the particular object of the present invention to provide an anti-oxidant composition suitable for stabilizing these organic compounds against oxidation when in storage or use. Further, the additive systems of the present invention have proven more effective than conventional anti-oxidants such as phenothiazine. The present invention thus provides an organic composition resistant to oxidation and containing minor amounts effective to retard oxidation of acenaphth [1,2-α] acenaphthylene, whose structure formula is

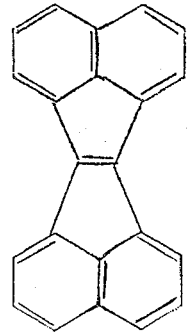

alone or in the organic base or in admixture with an anti-oxidant such as a mercapto alkanoic acid, a substituted phenol, an alkylated aromatic amine, etc. Advantageously, the present invention relates to a stabilized organic material containing acenaphth [1,2-α] acenaphthylene in amounts from about 0.001 to 5 weight percent, preferably about 0.01 to 1%, of the total composition and an antioxidant selected from the group consisting of substituted phenols, e.g. having about 7 to 20 carbon atoms, mercapto alkanoic acids, e.g. having from about 2 to 20 carbon atoms and alkylated aromatic amines, e.g. having from about 7 to 20 carbon atoms. The antioxidant which may be employed along with the acenaphth [1,2-α] acenaphthylene is usually present in amounts from about 0.001 to 5%, preferably about 0.01 to 1% by weight of the total composition. For obtaining best results, the relative minor concentrations of the additives may vary with the particular organic base material employed, and in any event the antioxidant system is compatible with the organic base at least to the extent of the former present. The organic base is, of course, the major component of the compositions.

A procedure for making acenaphth [1,2-α] acenaphthylene is reported in J. Organic Chemistry, vol 29, No. 1, p. 243, January 1964. The procedure consists essentially of reacting cis - 6b,12b-dihydroxy-6b,12b-dihydroacenaphth [1,2-α] acenaphthylene with HBr in chloroform at low temperatures.

In admixture with the acenaphth [1,2-α] acenaphthylene may be one or more of the various antioxidants compatible with the base organic material. More specifically, the anti-oxidants include, for instance, alkyl aromatic amines including those represented by the following general formula:

wherein Q is a monovalent hydrocarbon of 1 to 20 carbon atoms, preferably 6 to 12 carbon atoms, whose adjacent carbon atoms are no closer than 1.40 A., (i.e. a non-olefinic, non-acetylenic, monovalent hydrocarbon), and Q' is an aromatic hydrocarbon radical of 6 to 12 or 16 carbon atoms. Thus, Q can be an alkyl group, including cycloalkyl, or an aromatic group. Preferably, both Q and Q' are aromatic, and often at least one is a fused-ring aromatic, e.g. naphthyl. Q and Q' can be substituted with non-interfering substituents such as alkyl, aryl, hydroxyl amine groups, preferably alkyl or aromatic amines, and Q and Q' can be linked together by means of a non-interfering element such as carbon, sulfur and oxygen. Illustrative of suitable amines are phenothiazine, N-phenyl-, -naphthyl amine; di(2-naphthylamine); N,N'-diphenyl para-phenylene diamine; N'N-dioctyl para-phenylene diamine; N,N'-diheptyl-para-phenylene diamine; diphenyl amine; p-octyl diphenyl-amine; p-p'-dioctyl diphenyl amine, etc.

The substituted phenols which may be admixed with acenaphth [1,2-α] acenaphthylene to form an anti-oxidant mixture include those substituted phenols having the structure:

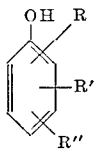

where R, R' and R" are selected from the group consisting of hydrogen, alkyl, including cycloalkyl, aromatic, alkoxy and amino. Preferably R is selected from the group consisting of lower alkyl, phenyl, lower alkoxy and amino and R' and R" are selected from the group selected from hydrogen and R. Among the substituted phenols of this invention are 2-tert-butyl-4-methyl phenol, p-tert-amyl phenol, 4-tert-butyl-2-phenol, o-cyclohexyl phenol, p-cyclohexyl phenol, 4-tert-butyl-o-cresol, 4-tert-butyl-2-phenyl phenol, p-phenyl phenol, 4-tert-butyl catechol, p-tert-octyl phenol, di-tert-butyl-p-cresol and para amino phenol. The preferred antioxidants which may be used with the acenaphth [1,2-α] acenaphthylene are alkylated and/or alkoxylated phenols, e.g. 2-tert-butyl-4-methoxy-phenol and 2,6-di-tert-butyl-4-methyl phenol.

The mercapto alkanoic acids which may be used in this invention include those represented by the following general formula;

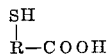

where R is an alkyl hydrocarbon having from 1 to 19 carbon atoms, e.g. 2-mercapto-ethanoic acid, 3-mercapto propanoic acid, 3-mercapto pentanoic acid, etc.

The organic compounds which may be stabilized in accordance with the present invention may be any organic compound which tends to deteriorate in storage and use due to oxidation. A preferred class of organic compounds are those non-gaseous, liquid and solid, including semisolid, organic compounds containing at least five carbon atoms, such as, high molecular weight polymers, e.g. polyisobutylene, low molecular weight polymers, e.g. polyphenyl ethers, alcohols e.g. iso-octyl alcohol; mineral oils and mineral oil products, e.g. soap-thickened mineral oils used as greases, etc. The polymers include, for example, polyisobutylene of any suitable molecular weight. Polyisobutylenes often have molecular weights in the range of about 1,000 to 300,000 and the rubbery materials usually have molecular weights of at least about 1,000,000, see U.S. Patents 2,130,507 and 2,426,820.

Other compounds which may be stabilized against oxidation in accordance with this invention are mineral oils and mineral oil products such as lubricating oils and soap-thickened lubricating oil greases. The anti-oxidants of the invention are also effective in liquid petroleum hydrocarbons such as light distillates, e.g. liquid hydrocarbons boiling up to and including gas oils. As examples the additive may be employed in gasoline, kerosene, petroleum solvents, diesel fuels, heating oils, etc. The oil stabilized by the anti-oxidant system of the invention may also be a lubricating mineral oil comprising a refined neutral or refined bright stock or the like or blends of two or more lubricating oil fractions which can be derived from Mid-Continent, naphthenic or Pennsylvania crudes.

A grease which may be employed with the novel additive combination of this invention can be a lubricating oil base stock thickened to grease consistency with a soap, for instance, a lithium soap of the ordinary saturated end unsaturated soap-forming fatty acids of about 12 to 20 carbon atoms. Highly preferred soaps are the soap-forming hydroxy fatty acids, e.g. 12-hydroxy stearic acid, and their simple esters and glycerides, such as hydrogenated castor oil. The amount of soap employed is that sufficient to thicken the base oil to grease consistency, and this amount is generally about 5 to 50 weight percent. The base oils thickened to grease consistency are of lubricating viscosity and can be petroleum lubricating oils derived from paraffinic, naphthenic, asphaltic or mixed base crudes. The oils may also be synthetic such as synthetic ester oils, e.g. di-2-ethylhexyl sebacate. The stabilized greases of this invention can also contain other additives such as extreme pressure agents, corrosion inhibitors and anti-oxidants.

Other organic compounds which may be stabilized in accordance with this invention include oxygen-containing materials, such as alcohols, ethers, ketones, aldehydes, etc. which are likely to deteriorate by oxidation on storage or in use. These compounds will often contain hydrocarbon chain groups of at least 5 carbon atoms, for example, isoctyl alcohol ($C_7H_{15}CH_2OH$) and polyphenylethers, preferably diphenyl ethers such as bis (phenoxyphenyl) ether.

The polyphenyl ethers which may be stabilized by the additive(s) of this invention include those of the general formula:

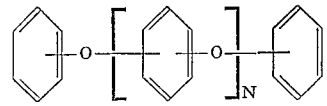

wherein N is a number from about 2 to 10, preferably from 2 to 8. Examples of polyphenyl ethers which can be stabilized are diphenyl ether, bis(phenoxyphenyl) ether, etc.

*Example I*

The effect of the anti-oxidant system of the present invention on the rate of oxygen absorption by a mineral lubricating oil having a viscosity index of 101 and a viscosity at 210° F. of 44 SUS, and thickened to grease consistency with 10% lithium 12-hydroxy stearate, was evaluated by the Norma-Hoffman oxidation procedure. This evaluation comprised measuring the amount of oxygen absorbed by the grease in a bomb at 210° F. A 20 gram sample of the grease was placed in a glass dish in an oxidation bomb at 210° F. and 110 p.s.i. of initial oxygen pressure. The pressure drop was recorded with time and the results are given in Table I.

TABLE I.—OXIDATION OF LITHIUM 12-HYDROXY STEARATE-THICKENED MINERAL OIL
[20 gram sample at 210° F., oxygen at 110 p.s.i.]

| Sample No. | Agent Tested | Amt., percent by wt. | Δp (28 hrs.) | Δp (30 hrs.) | Δp (44 hrs.) | Δp (80 hrs.) | Δp (144 hrs.) | Δp (165 hrs.) |
|---|---|---|---|---|---|---|---|---|
| 1 | None | 0 | 17 | 18 | 44 | 62 | | |
| 2 | Acenaphth[1,2-α]acenaphthylene | 1.0 | 7 | 13 | 17 | 38 | 41 | 44 |
| 3 | 2-tert-butyl-4-methoxy phenol | 1.0 | 10 | 12 | 19 | 44 | 55 | 63 |
| 4 | 2-tert-butyl-4-methoxy phenol + acenaphth[1,2-α]acenaphthylene | 0.5+0.5 | | | 3 | 4 | | 10 |
| 5 | 2-tert-butyl-4-methoxy phenol + pentacene | 0.5+0.5 | 8 | 10 | 17 | 31 | 33 | |
| 6 | 2-tert-butyl-4-methoxy phenol + coronene | 0.5+0.5 | | | 7 | 12 | 24 | 29 |
| 7 | 2-tert-butyl-4-methoxy phenol + perylene | 0.5+0.5 | | | 5 | 9 | 20 | 27 |

Example II

Polyisobutylene of 100,000 molecular weight (Staudinger) was milled with the antioxidant systems, as listed in Table II, for 8 minutes at 285 to 300° F. After milling, the products were tested for molecular weight (Staudinger). Then, the products were cut up into small pieces about 1/8″ to 1/4″ in diameter and placed on a 4″ watch glass. The samples, about 4 grams each, were placed in an air circulating oven held at 110° C. After the times listed the samples were removed and tested for molecular weight, clarity and odor. The results are given below in Table II.

TABLE III.—OXIDATION OF ISOOCTYL ALCOHOL

[50 cc. sample at 100° C., oxygen at 100 p.s.i.]

| Sample Number | Agent | Amount, percent by weight | ASTM Breakdown (in hrs.) |
|---|---|---|---|
| 1 | None | 0 | 12 |
| 2 | 2-tert-butyl-4-methoxy phenol | 0.01 | 23 |
| 3 | 2-tert-butyl-4-methoxy phenol + acenaphth [1, 2-α] acenaphthylene | 0.01+0.01 | 170 |
| 4 | Acenaphth [1, 2-α]acenaphthylene | 0.01 | 15 |
| 5 | ----do---- | 0.10 | 17 |

TABLE II.—OXIDATION OF POLYISOBUTYLENE OF 100,000 MOLECULAR WEIGHT

[4 gram sample at 110° C.]

| Sample No. | Agent Tested | Amount, percent by weight | M.W. (24 hrs.) | M.W. (72 hrs.) | M.W. (96 hrs.) | M.W. (144 hrs.) |
|---|---|---|---|---|---|---|
| 1 | None | 0 | 88,000 | 71,000 | 64,000 | 33,000 |
| 2 | Sulfur | 0.25 | 94,000 | 79,000 | 75,000 | 61,000 |
| 3 | Sulfur+acenapth [1,2-α]acenaphthylene | 0.25+0.10 | 97,000 | 94,000 | 91,000 | 86,000 |
| 4 | 2,6-di-tert-butyl-4-methyl phenol | 0.25 | 93,000 | 83,000 | 77,000 | 69,000 |
| 5 | 2,6-di-tert-butyl-4-methyl phenol+acenaphth [1,2α] acenaphtylene | 0.25+0.10 | 98,000 | 97,000 | 96,000 | 89,000 |

Example III

Isoctyl alcohol produced by the Oxo-process was washed with 10% KOH solution and distilled. The alcohol was then evaluated by ASTM test method number D–525–46. Thus, 50 cc. of the alcohol was placed in the bomb, after which was added oxygen to provide a pressure of 100 p.s.i. The bomb was then heated to 100° C. and the oxygen pressure was determined at 15 minute intervals. When sufficient time had elapsed so that the pressure dropped 10 p.s.i. in an interval of 15 minutes the test was discontinued, and the time required to reach this condition was recorded. This period is the ASTM breakdown time. The results are set forth in Table III.

Example IV

The grease described in Example I was tested for oxidation properties by the Norma-Hoffman procedure of Example I. Various anti-oxidants were evaluated singly and in admixture with acenapth [1,2-α]acenaphthylene, and the results are listed below in Table IV.

TABLE IV.—OXIDATION OF LITHIUM 12 HYDROXY STEARATE-THICKENED MINERAL OIL

[20 gram sample at 210° F., oxygen at 110 p.s.i.]

| Sample No. | Compound | Amount, percent by weight | Δp (28 hrs.) | Δp (30 hrs.) | Δp (44 hrs.) | Δp (80 hrs.) | Δp (144 hrs.) |
|---|---|---|---|---|---|---|---|
| 1 | None | | 17 | 18 | 44 | 62 | |
| 2 | Isopropyl phenylamine | 0.5 | 4 | 4 | 4 | 5 | 12 |
| 3 | Isopropyl phenylamine + acenapth [1, 2-α] acenaphthylene | 0.5+0.01 | 2 | 3 | 3 | 4 | 5 |
| 4 | Acenaphth [1, 2-α] acenaphthylene | 0.01 | 10 | 17 | 28 | | |
| 5 | 2-mercapto ethanoic acid | 0.50 | 8 | 15 | 31 | | |
| 6 | 2-mercapto ethanoic acid + acenapth [1, 2-α] acenaphthylene | 0.50+0.01 | 2 | 14 | 23 | | |

Example V

The polyisobutylene of Example II was evaluated by the test in Example II but was milled with other additive combinations. The results are listed below in Table V.

TABLE V.—OXIDATION OF POLYISOBUTYLENE OF 100,000 MOLECULAR WEIGHT

[4 gram sample at 110° C.]

| Sample No. | Compound | Amount, percent by weight | M.W. (24 hrs.) | M.W. (72 hrs.) | M.W. (96 hrs.) | M.W. (144 hrs.) |
|---|---|---|---|---|---|---|
| 1 | None | | 88,000 | 71,000 | 64,000 | 33,000 |
| 2 | Isopropylphenylamine | 0.25 | 96,000 | 88,000 | 79,000 | 72,000 |
| 3 | Isopropylphenylamine + acenaphth [1,2-α] acenaphthylene | 0.25+0.01 | 100,000 | 98,000 | 92,000 | 74,000 |

Example VI

Isoctyl alcohol of Example II was evaluated according to the test in Example III but with different anti-oxidant mixtures. The results are listed below.

TABLE VI.—OXIDATION OF ISOCTYL ALCOHOL

[50 cc. sample at 100° C., oxygen at 100 p.s.i.]

| Sample No. | Agent | Amount, percent by weight | ASTM Breakdown in hours |
|---|---|---|---|
| 1 | None | 0 | 12 |
| 2 | Isopropylphenylamine | 0.01 | 19 |
|  | do | 0.01+ |  |
| 3 | Acenaphth [1,2-α]acenaphthylene. | 0.01 | 73 |
| 4 | do | 0.01 | 15 |

Example VII

Polyethylene made by a high pressure peroxide procedure was evaluated according to the procedure for oxygen uptake discussed in Journal of Applied Polymer Science, volume 1, page 37 (1959) by W. L. Hankins, R. H. Hansen, W. Matreyck and F. H. Winslow. The results are shown in Table VII below.

TABLE VII.—OXIDATION OF POLYETHYLENE (AT 140° C.)

| Sample No. | Molecular Wt. | Absolute Viscosity at 130° C. in poise | ASTM D-29-42T Ball and Ring Soft Point, °C. | Oxygen Uptake in cc./gm. at 140° C. | |
|---|---|---|---|---|---|
| | | | | Blank | 0.1% acenaphth [1,2-α]acenaphthylene |
| 1 | 770 | 0.4 | 35.0 | 10 cc. in 40 hours | 8 cc. in 400 hours. |
| 2 | 3,750 | 5.15 | 92.0 | 15 cc. in 40 hours | 10 cc. in 400 hours. |
| 3 | 6,950 | 151.00 | 100.5 | 12 cc. in 40 hours | 12 cc. in 400 hours. |

It can be seen from the examples that acenaphth 1,2-acenaphthylene provides good oxidation stability for many types of organic compounds which are susceptible to oxidation deterioration, e.g. greases, polymers and alcohols. Further, it can be seen that a mixture of acenaphth [1,2-α]acenaphthylene with other antioxidants, e.g. aromatic amines, mercapto alkanoic acids or substituted phenols, provides even greater oxidation stability.

Example VIII

Three samples of bis (phenoxyphenyl) ether containing varying amounts of acenaphth [1,2-α] acenaphthylene were prepared by heating the mixtures on a steam bath. Four other samples were prepared contining phthlimide, common stabilizer for the ethers. A sample was also prepared which contained no acenaphth [1,2-α] acenaphthylene or other invention. The samples were treated by placing them on an electric hot plate at 600° F. for 24 hours, while bubbling 4.3 liters of air per hour through a glass sparger near the bottom of the liquid. The initial and final viscosity of each sample were determined by an Ostwald viscosity tube. Since the viscosity of polyphenyl ethers increases when degradation occur under high temperature use, the following formula may be used to determine the percent stabilization which can be realized by the addition of an additive:

$$\frac{V_1 - V_2}{V_1} \times 100 = \text{percent stabilization}$$

where $V_1$=percent viscosity increase of unstabilized polyphenyl ether after the oxidation test, and $V_2$=percent viscosity increase of stabilized polyphenyl ether after the oxidation test.

The results of the tests are shown in Table VIII.

TABLE VIII.—OXIDATION OF BIS (PHENOXYPHENYL) ETHER [AT 600° F. FOR 24 HOURS]

| Sample No. | Agent | Amount, percent by weight | Percent stabilization |
|---|---|---|---|
| 1 | None | | 0 |
| 2 | Acenaphth (1,2-α)acenaphthylene. | 0.25 | 47 |
| 3 | do | 0.50 | 69 |
| 4 | do | 1.00 | 68 |
| 5 | Phthalimide | 0.25 | 40 |
| 6 | do | 0.50 | 39 |
| 7 | do | 0.75 | 42 |
| 8 | do | 1.00 | 44 |

I claim:

1. A composition of matter consisting essentially of a major proportion of an organic material normally subject to oxidative deterioration selected from the group consisting of hydrocarbon polymers, alcohols, liquid hydrocarbons boiling up to and including gas oils, soap-thickened greases, ethers, and lubricating oils and a minor proportion of acenaphth [1,2-α] acenaphthylene sufficient to retard the oxidative deterioration of said organic material.

2. The composition of claim 1 wherein the acenaphth [1,2-α] acenaphthylene is present in amounts of from about 0.01 to 1% weight.

3. The composition of claim 2 wherein the organic material subject to oxidative deterioration is solid polyethylene.

4. The composition of claim 2 wherein the organic material subject to oxidative deterioration is a lithium 12-hydroxy stearate-thickened grease.

5. The composition of claim 2 wherein the organic material subject to oxidative deterioration is isooctyl alcohol.

6. An organic composition having improved anti-oxidant properties consisting essentially of an organic material which exhibits oxidative deterioration in storage and use, selected from the group consisting of hydrocarbon polymers, alcohols, liquid hydrocarbons boiling up to and including gas oils, soap-thickened greases, ethers, and lubricating oils containing an anti-oxidant combination consisting essentially of acenaphth [1,2-α] acenaphthylene and an organic anti-oxidant selected from the group consisting of mercapto alkanoic acids, phenols having the structure

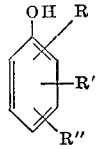

where R is selected from the group consisting of lower alkyl, phenyl, lower alkoxy and amino and R' and R" are selected from the group consisting of hydrogen and R, and alkyl aromatic amines, said anti-oxidant components being present in an amount sufficient to retard the oxidative deterioration of said organic material.

7. The composition of claim 6 wherein the acenaphth [1,2-α] acenaphthylene is present in amounts of from about 0.001 to 5% by weight and the organic anti-oxidant component is present in an amount of from about 0.001 to 5% by weight.

8. The composition of claim 6 wherein the organic antioxidant is a substituted phenol having the structure

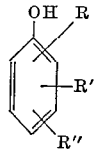

where R is selected from the group consisting of lower alkyl, phenyl, lower alkoxy, and amino and R' and R" are selected from hydrogen and R.

9. The composition of claim 8 wherein the substituted phenol is 2-tert-butyl-4-methoxy phenol.

10. The composition of claim 8 wherein the substituted phenol is 2,6-di-tert-butyl-4-methyl phenol.

11. The composition of claim 8 wherein the organic material subject to oxidative deterioration is a soap-thickened grease.

12. The composition of claim 8 wherein the organic material is solid polyisobutylene.

13. The composition of claim 8 wherein the organic material is solid polyethylene.

14. The composition of claim 8 wherein the organic material is isooctyl alcohol.

15. The composition of claim 2 wherein the organic material subject to oxidative deterioration is a polyphenyl ether having the formula:

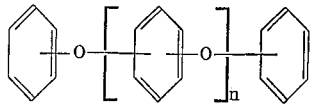

where $n$ is a number from 2 to 10.

16. The composition of claim 15 wherein the organic material subject to oxidative deterioration is bis (phenoxyphenyl) ether.

References Cited

UNITED STATES PATENTS

| | | | |
|---|---|---|---|
| 2,390,363 | 12/1945 | Flowers | 260—668 |
| 2,777,820 | 1/1957 | Hirechler | 252—59 |

FOREIGN PATENTS

| | | |
|---|---|---|
| 598,857 | 2/1948 | Great Britain. |

DANIEL E. WYMAN, *Primary Examiner.*

I. VAUGHN, *Assistant Examiner.*